United States Patent [19]

Trocciola et al.

[11] Patent Number: 4,782,669

[45] Date of Patent: Nov. 8, 1988

[54] COOLING SYSTEM FOR A BURST POWER FUEL CELL

[75] Inventors: John C. Trocciola, Glastonbury; Leslie L. VanDine, Manchester, both of Conn.

[73] Assignee: International Fuel Cells Corporation, South Windsor, Conn.

[21] Appl. No.: 931,592

[22] Filed: Nov. 17, 1986

[51] Int. Cl.[4] .............................................. F25D 17/02

[52] U.S. Cl. .................................. 62/434; 165/104.17; 429/20

[58] Field of Search ................... 62/59, 332, 330, 434; 165/104.17; 429/20; 244/158 R

[56] References Cited

U.S. PATENT DOCUMENTS

| | | | |
|---|---|---|---|
| 3,110,633 | 12/1963 | Bachmann | 136/161 |
| 3,253,423 | 5/1966 | Sonnabend | 62/239 |
| 3,365,334 | 1/1968 | Thellmann | 136/86 |
| 3,466,196 | 9/1969 | Gosmand | 136/86 |
| 3,672,183 | 6/1972 | Bernstein | 62/59 |
| 3,745,048 | 7/1973 | Dinkler et al. | 136/166 |
| 3,906,742 | 9/1975 | Newton | 62/332 |
| 4,099,557 | 7/1978 | Bricard et al. | 62/59 |
| 4,283,925 | 8/1981 | Wildfeuer | 62/332 |
| 4,362,789 | 12/1982 | Dighe | 429/17 |
| 4,446,910 | 5/1984 | Miller et al. | 62/59 |

*Primary Examiner*—Ronald C. Capossela
*Attorney, Agent, or Firm*—William J. Sapone

[57] ABSTRACT

Spaced based burst power fuel cells generate large thermal loads in very short time periods. In order to avoid external venting or the use of heavy radiators in space vehicles, such fuel cells must include onboard closed-loop cooling systems. Utilizing subcooled ice as a cooling medium, contactable with either the anode, cathode or coolant recirculating stream provides the fuel cell with a safe, highly efficient and low weight heat absorption capability.

11 Claims, 3 Drawing Sheets

COOLING SYSTEM FOR A BURST POWER FUEL CELL

CROSS REFERENCE TO RELATED APPLICATION

This application is related to copending application titled "Multiple Heat Sink Cooling System For a Burst Power Fuel Cell", filed on even date herewith, Attorney Docket No. CPS-1.

TECHNICAL FIELD

This invention relates to fuel cells and more particularly to closed-loop cooling systems for space based burst power fuel cells.

BACKGROUND ART

A fuel cell generally includes a stack of power generating elements which process reactants such as hydrogen and oxygen in an electro-chemical reaction which produces electrical energy. The reaction is exothermic, generating heat as well as by-product water. The heat of reaction must be continuously removed in order to prevent the cell temperature from rising above optimum temperature for system efficiency.

Burst power fuel cells are devices which release substantial amounts of energy in very short time periods, on the order of seconds to minutes, in contrast to the much longer periods provided by non-burst power fuel cell systems. Such a rapid release in energy requires a complimentary rapid heat absorbing system in order to maintain the cell at its optimum operating temperature during the discharge cycle. Such burst power fuel cells have particular application in a number of emerging space missions which will require space based, electrically powered devices capable of providing instantaneous power bursts. Such a utilization places special limitations in terms of weight and complexity on the choice of a cooling system.

In U.S. Pat. No. 3,253,423, a cryogenic cooling system for space vehicles is disclosed which utilizes solid hydrogen as a cooling agent. Besides the hazards and complexity involved in loading such a system, there is a particular problem with venting the apparatus to space, with such venting causing platform instabilities. In addition, such vented gases can detrimentally affect platform sensors and impair or interrupt any beams or signals the device may be emitting or receiving from ground based or spaced based sources. The use of a radiator to cool the system, shown in FIG. 1 of the above-referenced patent, results in a system which is vulnerable to damage by meteroids or other debris. In addition, such a radiator is quite heavy, comprising a significant portion of the system weight and thereby adding a substantial fuel penalty on launch.

In U.S. Pat. No. 3,466,199, an isothermal assembly is disclosed for insulating a device from extreme cold by encasing it in ice. This provides a constant 0° C. temperature to the insulated device. While useful in insulating a passive device from extremely cold temperatures, it would not provide temperature control of an active heat generating device.

Generally, ground based fuel cells utilize double-loop cooling systems which require pumps, heat exchangers and complex piping (see FIG. 1). While providing safe and efficient cooling for ground base fuel cells, limitations in terms of weight and space preclude the adaptation of such cumbersome systems to space based fuel cells. Consequently, what is needed in the art is a cooling system adaptable to space based burst power fuel cells which conforms to the severe restrictions in terms of weight, space and emissions.

DISCLOSURE OF INVENTION

It is an object of the present invention to provide a closed-loop heat absorbing system that does not require external radiators or involve external venting of gases, vapors or liquids.

It is a further object of the present invention to provide a closed-loop heat absorbing system that is capable of absorbing large quantities of energy in short periods while minimizing space and weight requirements.

It is a further object of the present invention to provide a closed-loop cooling system which is leak tolerant.

These and other objects of the present invention are achieved by utilizing a cooling system adapted for cooling space based active heat generating devices. The cooling system includes a coolant stream continuously recirculatable through the device, with the coolant heated therein, a heat sink disposed within the coolant stream and in fluid communication therewith with the coolant passing therethrough, and ice, disposed within the heat sink and contactable with the coolant such that a desired coolant temperature is achieved. In a burst power fuel cell, the coolant stream is directed to a heat sink containing ice with direct contact between the recirculating coolant (water) and the ice contained in the heat sink cooling the stream before return to the fuel cell.

In an alternate embodiment of the present invention, the anode or cathode recirculating gas stream of a fuel cell is similarly directed to a heat sink containing ice. In operation, a burst power fuel cell produces a heated anode stream containing hydrogen and water vapor, which must be cooled before return to the fuel cell. Other fuel cells produce water vapor in the cathode stream and may be treated similarly. When the anode stream contacts the ice, the ice is heated to its melting point and beyond, up to an optimum operating temperature for the fuel cell. Since the anode stream includes only reactant gas and by-product water, no contamination of the fuel cell can occur and direct contact is possible, eliminating the need for heat exchangers and providing a leak tolerant cooling system. Utilizing ice stored at minus 127° F. and heated to 250° F. allows absorption of 385 Btus of waste heat per pound of water. By providing enough ice to absorb the heat released in a burst power cycle, no radiators are needed nor is external venting required and any auxiliary equipment is kept at a minimum.

BEST MODE FOR CARRYING OUT THE INVENTION

Figure 1:
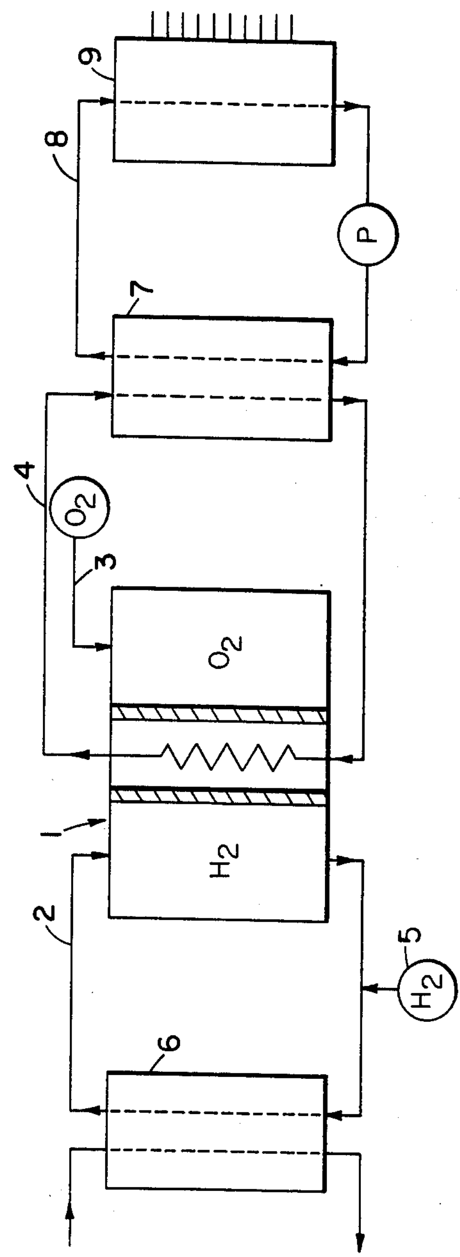
FIG. 1 illustrates a prior art fuel cell cooling system.

Referring to FIG. 1, a prior art fuel cell cooling system is shown. The fuel cell 1 has an anode stream 2, a cathode stream 3 and a recirculating coolant stream 4, with the anode stream 2 generally comprising a mixture of hydrogen and water vapor which is recirculated through the fuel cell. Fresh hydrogen is added to the recirculating anode stream from a storage tank 5 prior to passage of the anode stream through a first heat exchanger 6, wherein the anode stream is cooled and excess water vapor condensed. The cathode stream 3, which may also be a recirculating stream, comprises oxygen which is fed to the fuel cell. For exemplary purposes, the oxygen is shown to be completely consumed within the fuel cell and no exhaust stream is generated. The coolant stream 4 circulates through the fuel cell 1 and removes heat which is then transferred through a second heat exchanger 7 into an auxiliary cooling stream 8, which circulates through a radiator 9 which may utilize either outer space or the atmosphere as a heat sink. Two cooling loops are required to provide controlled cooling of the fuel cell 1. Generally, the primary stream 4 utilizes fluorocarbon liquids as the circulating medium, with water utilized in the auxiliary cooling stream 8.

Figure 2:
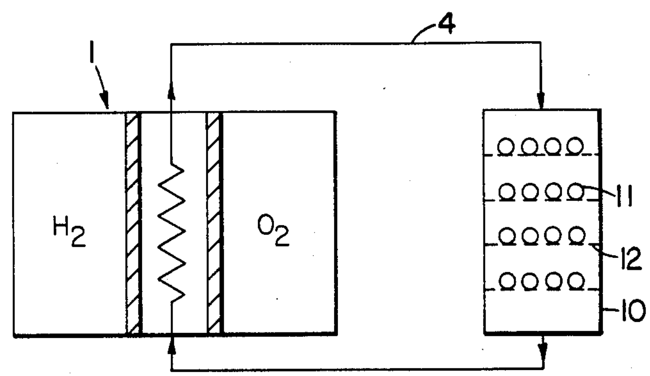
FIG. 2 illustrates the fuel cell cooling system of the present invention, utlizing ice to cool the fuel cell recirculating coolant stream.

Referring to FIG. 2, the fuel cell cooling system of the present invention is shown, which utilizes ice as a cooling medium. The fuel cell 1 still includes the coolant stream 4, however, the recirculating coolant is water. The stream 4 passes through a heat sink 10 which contains solid ice 11 stored in a series of beds 12. The ice is subcooled, preferably to −127° F., in order to optimize the heat absorption capability of the heat sink. It is expected that in a typical burst power cycle, all the ice will be heated from approximately −127° F. to 32° F., melted and the resulting water then heated from 32° F. to approximately 250° F. The total heat capacity is, therefore, approximately 325 Btus per pound of water. Of course, the final temperature of the heat sink is a function of the fuel cell operating temperature and higher operating temperature fuel cells will result in a higher final temperature for the heat sink.

Ice is utilized in the present invention due to its advantageous thermodynamic properties as well as its compatibility with the fuel cell gas streams. For the range of materials generally considered for use in thermal heat sinks, ice/water has the highest heat storage capability which results in the lowest weight system, thereby making the ice/water system ideal for use with space based heat generating devices.

Figure 3:
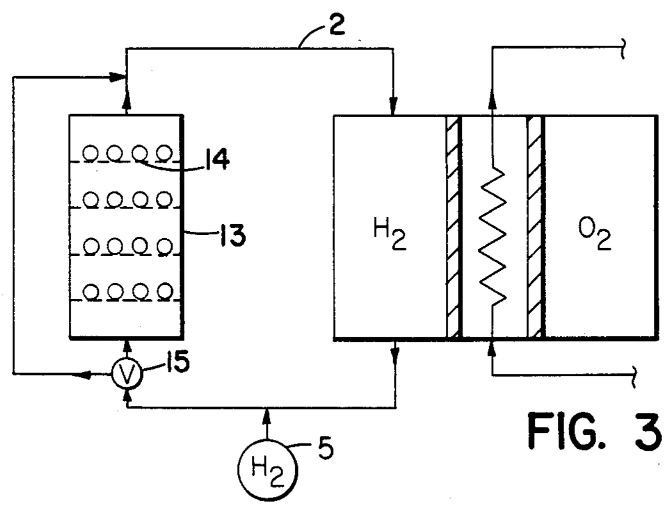
FIG. 3 is a schematic representation of the fuel cell cooling system of the present invention, utilizing ice to cool the anode recirculating stream.

Referring to FIG. 3, a fuel cell cooling system is shown for cooling the recirculating anode gas stream 2 and condensing the excess by-product water vapor. It should be understood that water vapor is generated within the fuel cell as hydrogen and oxygen react to generate electricity. The anode gas stream is a recirculating type stream, which allows return of unreacted hydrogen to the fuel cell, along with fresh hydrogen, which is provided from the storage tank 5. In operation, the anode stream 2 exits the fuel cell 1 as a hot mixture of unreacted hydrogen and water vapor. The fresh hydrogen is then added and the combined gas stream passed through a heat sink 13 which includes ice beds 14. As stated previously, the beds contain subcooled ice, preferably at −127° F., and direct contact is utilized to condense the water vapor and cool the gas stream, providing a leak tolerant system since cross contamination is impossible. In order to maintain the fuel cell at its optimum temperature, for example, 250° F., a valve 15 is utilized which allows bypassing of a portion of the hot anode stream around the heat sink, later mixing the bypassed portion with the cooled stream to achieve precise temperature control.

Figure 4:
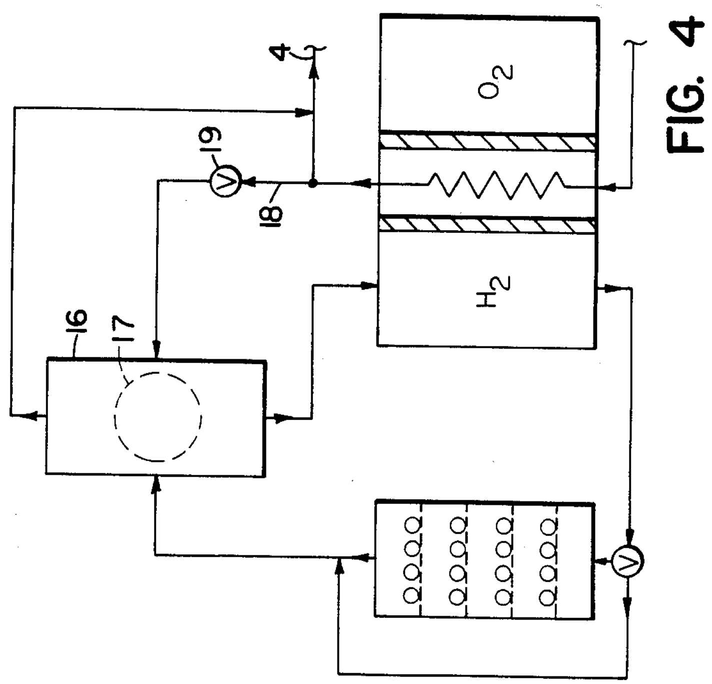
FIG. 4 is a schematic representation of the fuel cell cooling system of the present invention, which includes dew point control of the anode recirculating stream.

Referring to FIG. 4, an alternative anode cooling system is shown which utilizes the cooling system of the present invention. This alternative embodiment includes a saturator 16 which provides precise dew point control of the returning anode stream. In the initial phases of fuel cell operation, the anode stream, even with the bypass arrangement, may be overly subcooled due to the low temperature of the stored ice. To obtain optimum fuel cell efficiency, constant temperature and humidity control must be provided over the full period of the power discharge cycle. Thus, it may initially be necessary to add heat and water vapor to the returning anode stream. Such heat and water vapor are obtained by locating the saturator 16, which includes a direct contact mixing chamber 17, in the returning anode stream 2, taking a side stream 18 from the heated coolant stream 4 in an amount sufficient to provide the optimum temperature and dew point, and circulating the side stream through the saturator, contacting the cooled, dry anode gas stream, before return to the coolant stream. It is expected that such supplemental temperature and dew point control will be required initially and then taper off as the ice bed heat sink warms up. A valve 19 controls the flow of coolant to the saturator.

Figure 5:
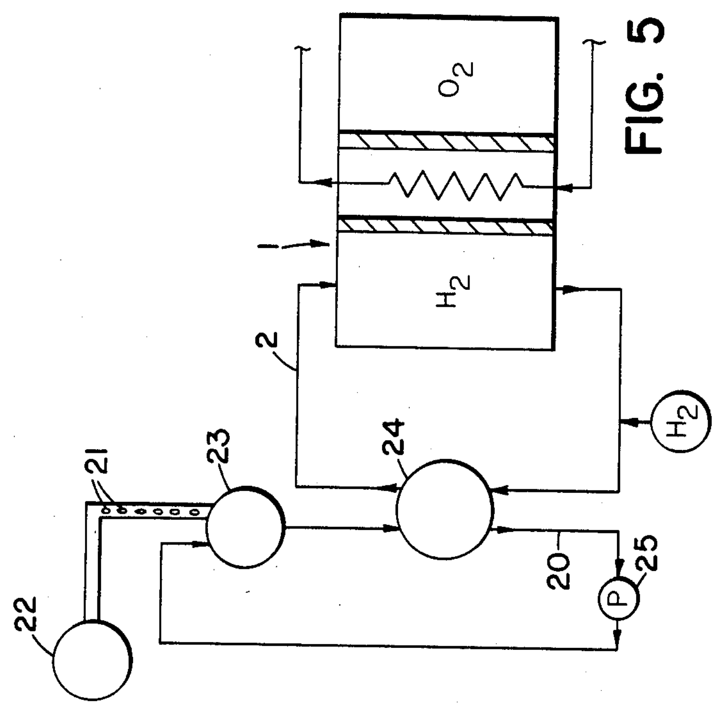
FIG. 5 is a schematic representation of an alternative embodiment of the fuel cell cooling system of the present invention, utilizing ice pellet addition to a secondary coolant stream.

In another embodiment of the present invention, illustrated in FIG. 5, fuel cell cooling is accomplished by utilizing a secondary water coolant stream 20 contactable with the anode stream 2. In operation, ice pellets 21 are stored in a container 22 at subcooled temperatures and then dropped into a cooling chamber 23, with the stream 20 circulating therethrough, consuming the pellets. The ice addition is controlled by the temperature requirement of the fuel cell. The cooled stream 20 is then contacted with the anode gas stream 2 in a contactor 24, cooling the gas stream and condensing the excess water vapor. The combined gas/liquid stream is then separated, with the liquid passing through a pump 25 for recirculation while the cooled anode gas stream 2 is returned to the fuel cell 1. Direct contact is still utilized between the anode gas stream 2 and the water coolant in the contactor 24, thereby eliminating heat exchangers. While a more complex system, this embodiment prevents overcooling of the recirculating stream with possible ice formation and stream blockage and provides inherent dew point control. Of course, the ice pellet addition system described may be used to cool the recirculating coolant stream 4 directly, without requiring the secondary coolant stream, pump and cooling chamber.

It will be understood by those skilled in the art that the complete fuel cell cooling system may comprise cooling of the cooling stream, anode stream and cathode stream utilizing subcooled ice disposed in or added to closed-loop cooling systems, and include an adaptable control system for monitoring and controlling the fuel cell operation. It will be understood by those skilled in the art that the choice of control system will vary with the system requirements and that any analog, digital or microprocessor based system may be used. While this invention has been described in relation to cooling systems for burst power fuel cells, it will be understood by those skilled in the art that other space based active heat generating devices may benefit from the present invention. In addition, it will be understood by those skilled in the art that the quantities, times and temperatures discussed are exemplary and that the particular parametric requirements may vary with each application, and that such variations do not depart from the scope of the present invention. For example, while an optimum fuel cell temperature of 250° F. was discussed, it will be understood by those skilled in the art that optimum fuel cell temperatures may range from 200°-400° F.

Having thus described the invention, what is claimed is:

1. A closed loop cooling system for a heat generating device located in a spacecraft comprising: a coolant stream continuously recirculatable through said heat generating device, said coolant being heated therein; a heat sink disposed within said coolant stream and in fluid communication therewith, wherein said coolant passes therethrough; and, subcooled ice, disposed within said heat sink, said subcooled ice being in direct contact with said coolant such that all heat generated in said device is absorbed by said subcooled ice wherein a total phase change is achieved.

2. The cooling system of claim 1 wherein said subcooled ice is at a temperature of −127° F.

3. A fuel cell closed loop cooling system for a burst power fuel cell located in a spacecraft comprising: a fuel cell having a coolant stream continuously recirculatable therethrough, said coolant being heated therein; a heat sink disposed within said coolant stream and in fluid communication therewith, wherein said coolant passes therethrough; and, subcooled ice disposed within said heat sink, said subcooled ice being in direct contact with said coolant such that all heat generated in said device is absorbed by said subcooled ice wherein a total phrase change is achieved.

4. The cooling system of claim 3 wherein said subcooled ice is at a temperature of −127° F.

5. A fuel cell closed loop cooling system for a burst power fuel cell located in a spacecraft comprising: a coolant stream continuously recirculatable through said fuel cell, said coolant being heated therein; subcooled ice; means for containing said subcooled ice; a cooling chamber, in fluid communication with said coolant recirculating stream which passes therethrough, said chamber similarly in communication with said subcooled ice containment means; and, means for adding said subcooled ice to said chamber in an amount sufficient to provide an optimum cooling temperature to said coolant stream passing therethrough; said subcooled ice being in direct contact with said coolant such that all heat generated in said device is absorbed by said subcooled ice wherein a total phase change is achieved.

6. The cooling system of claim 5 wherein said subcooled ice is at a temperature of −127° F.

7. A fuel cell closed loop cooling system for space based burst power fuel cells comprising: a fuel cell, having a continuously recirculatable anode or cathode gas stream; a heat sink, containing ice disposed therein; means for directing a controlled portion of said anode or cathode stream to said heat sink, wherein said controlled portion of said anode or cathode stream is contacted with said ice in said heat sink such that excess water vapor is removed while said anode or cathode gas stream is cooled; means for passing the balance of said stream by said heat sink; and, means for combining said bypassed stream with said cooled portion before return to said fuel cell.

8. The fuel cell cooling system of claim 7, wherein said fuel cell includes a coolant stream continuously recirculatable therethrough, said coolant being heated therein, and further comprising a saturator, in fluid communication with said coolant stream as well as said anode or cathode recirculating stream, said saturator including a mixing chamber for contacting the cooled combined anode or cathode stream with the heated coolant stream in an amount sufficient to provide an optimized temperature and dew point in the returning anode or cathode stream.

9. The cooling system of claim 7 wherein said subcooled ice is at a temperature of −127° F.

10. A fuel cell closed loop cooling system for space based burst power fuel cells comprising: a fuel cell, having a continuously recirculatable anode or cathode gas stream, a secondary recirculating stream; a cooling chamber in fluid communication with said secondary recirculating stream; ice; means for containing said ice, said containment means in communication with said cooling chamber; means for adding said ice to said chamber in an amount sufficient to provide an optimum cooling temperature to the secondary stream passing therethrough, means for contacting said cooled secondary recirculating stream with said anode or cathode stream, thereby cooling said anode or cathode stream and removing excess water vapor; and, means for separating said anode or cathode stream from said secondary recirculating stream before returning said cooled anode or cathode stream to said fuel cell.

11. The cooling system of claim 10 wherein said subcooled ice is at a temperature of −127° F.

* * * * *